Dec. 3, 1929.                R. M. CRITCHFIELD                1,738,171

DYNAMO ELECTRIC MACHINE

Original Filed July 29, 1926

Inventor

Robert M. Critchfield

By Spencer Small & Hardman his Attorneys

Patented Dec. 3, 1929

1,738,171

UNITED STATES PATENT OFFICE

ROBERT M. CRITCHFIELD, OF ANDERSON, INDIANA, ASSIGNOR, BY MESNE ASSIGNMENTS, TO DELCO-REMY CORPORATION, OF DAYTON, OHIO, A CORPORATION OF DELAWARE

DYNAMO-ELECTRIC MACHINE

Application filed July 29, 1926, Serial No. 125,673. Renewed February 28, 1928.

This invention relates to dynamo electric machines and especially to small electric motors. One of the objects of the present invention is to simplify the construction and to reduce the cost of manufacture of the brush rigging.

A further object is to secure a good electrical contact between the brush and the box type brush holder in which the brush is slidably supported.

Still another object is to provide for proper lubrication of the shaft bearings and at the same time prevent excess oil from the bearing coming into contact with the commutator.

Further objects and advantages of the present invention will be apparent from the following description, reference being had to the accompanying drawings, wherein a preferred form of embodiment of the present invention is clearly shown.

Figure 1:
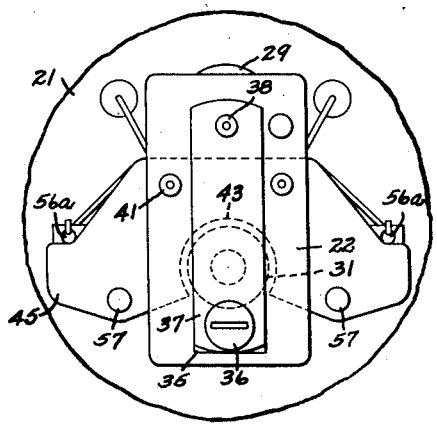
Fig. 1 is an end view of a dynamo electric machine embodying the present invention.
Figure 2:
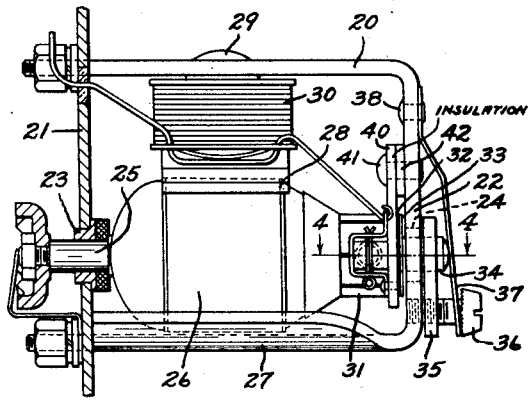
Fig. 2 is a view partly in section.

The present invention is shown in its application to a small electric motor for a motor driven horn such as shown in the copending application of Robert M. Critchfield, Serial No. 112,268, filed May 28, 1926. In the drawings, 20 designates a U-shaped magnetizable body which is attached to a plate 21 and cooperates therewith to provide the field frame from the electric motor. The U-shaped frame member 20 includes an end member 22. The members 21 and 22 support bearings 23 and 24, respectively, in which an armature shaft 25 is journaled. The armature core 26 rotates between a pole piece 27 formed by one of the legs of frame 20, and a pole shoe 28 attached by a rivet or stud 29 to the other leg of the frame 20. The stud 29 is surrounded by a magnet coil 30.

The shaft 25 carries a commutator 31; and, in the space between the commutator 31 and the end frame 22 the shaft 25 carries an insulating disc 32 and a dished oil throwing disc 33, the concave side of the disc being adjacent the end frame member 22. A fibrous pad 35 such as felt which is saturated with lubricating oil is placed over the end of shaft 25 adjacent the shaft end 34 in order to supply the shaft and bearing with lubricating oil. A screw 36 passes through the pad 35 and threadedly engages the end frame 22 and thus prevents rotation of the pad. The screw is engaged by the free end of leaf spring 37 which is attached by rivet 38 to the end frame 22 and which engages the end 34 of the shaft 25. By turning the screw, the shaft 25 may be adjusted endwise. The excess lubricating oil which may run out from the bearing between the commutator and the frame member 22 will be thrown outwardly from the shaft 25 by the disc 33. The commutator and brushes are protected from this lubricating oil to a certain extent by a part of the brush rigging which will now be described.

Figure 3:
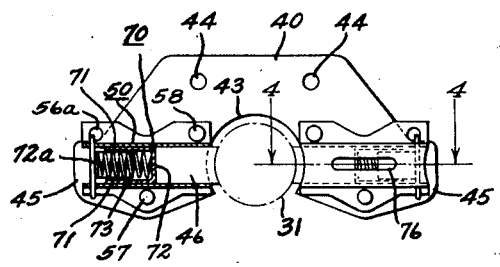
Fig. 3 is an elevation of the brush rigging.
Figure 4:
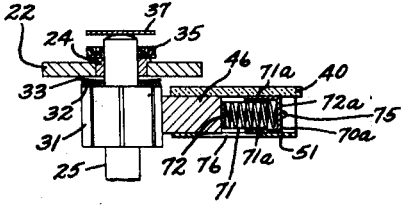
Fig. 4 is a sectional view on the line 4—4 of Fig. 3 and Fig. 2.
Figure 5:
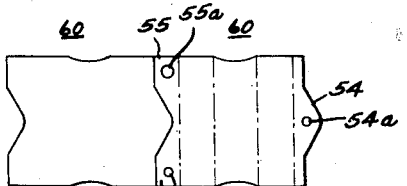
Fig. 5 is a view showing the manner of cutting sheet metal blanks for forming the brush guides.
Figure 6:
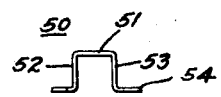
Fig. 6 is an end view of a brush guide formed from one of the pieces shown in Fig. 5.

The brush rigging comprises a non-conducting plate 40 which is attached by rivets 41 to the end frame member 22. A block 42 is secured by the rivets 41 for the purpose of spacing the plate 40 from the member 22. The spacing is such that oil thrown from the disc 33 will pass into the space between the plate 40 and the member 22. The plate 40 is located in the plane of a portion of the commutator 31 and is provided with a notch 43 to provide clearance for the commutator. It will be noted that the major portion of the commutator is surrounded by the plate 40. This arrangement assists in preventing lubricating oil thrown by the disc 33 from coming into contact with the commutator 31 and brushes to be described. The plate 40 is provided with holes 44 for receiving the rivets 41 and includes wings 45 located on opposite sides of the commutator 31. Each wing 45 carries a channel shaped metal member 50 which cooperates with the wing 45 to provide a box type brush holder or guide for a brush 46 adapted to bear against the member 50 and commutator 31. The web portion 51 of the member 50 is located parallel to the plane of the plate 40 and the flange portions 52 and 53 thereof are located at right angles thereto. The flange member 53 is provided with an ear or lug 54 which is somewhat triangular in shape. The flange 52 is provided with two ears or lugs 55 and 56 which are separated by a notch corresponding in shape to that of the lug 54. As clearly shown in Fig. 5, the blank 60 from which the parts are made can be formed for providing the lugs 54, 55 and 56 without waste of metal. These lugs are provided respectively with apertures 54$^a$, 55$^a$ and 56$^a$. A rivet 57 passes through the hole 54$^a$ to secure the lug 54 to the plate 40, and a rivet 58 passes through either one of the holes 55$^a$ or 56$^a$ in order to secure one of the other lugs of the member 50 to the plate 40. The remaining hole of the member 50, for example, hole 56$^a$ of the brush holder 50 which is located to the left of the commutator as viewed in Fig. 3, receives a wire which is slipped through said hole and is soldered to the brush holder 50 in order to make an electrical connection.

A good electrical contact between the brush 46 and brush holder 50 is provided by a resilient U-shaped member 70 having its branches 71 bearing against the flanges 52 and 53 of the brush holder and having its yoke 72 bearing against the brush 46. The conductor 70 and the brush 46 are urged yieldingly against the commutator 31 by a spring 73 bearing at one end against the yoke 72 of the conductor 70 and at the other end against the yoke 72$^a$ of a V-shaped member 70$^a$ which is similar to the member 70. The member 70$^a$ is located so that its branches 71$^a$ bear against the plate 40 and the web 51 of the brush holder 50. The member 70$^a$ is retained in position by a pin 75 which extends through the flange portions 52 and 53. If desired the web 51 may be provided with a slot 76 through which the brush may be observed in order to determine to what extent it has been worn.

While the form of embodiment of the present invention as herein disclosed, constitutes a preferred form, it is to be understood that other forms might be adopted, all coming within the scope of the claims which follow.

What is claimed is as follows:

1. A dynamo-electric-machine comprising, in combination, a frame including an end member, a field magnet supported by the frame, a shaft journaled in a bearing carried by the end member, an armature and a commutator carried by the shaft, the commutator being adjacent but spaced from the end member, means for lubricating the bearing, a brush rigging supported by the frame adjacent the side of the end member nearest the commutator and including a brush supporting plate spaced from the end frame and provided with a recess into which the commutator extends, and an oil throwing disc carried by the shaft and located between the planes of the end member and plate.

2. A dynamo-electric-machine according to claim 1, in which the bearing lubricating means includes an oil soaked pad of fibrous material surrounding the shaft and located adjacent the side of the end member opposite the brush supporting plate.

3. A dynamo-electric-machine comprising, in combination, a frame including an end member, a field magnet supported by the frame, a shaft journaled in a bearing carried by the end member, an armature and a commutator carried by the shaft, the commutator being adjacent the end member, a non-conducting brush supporting plate attached to the end member, a channel-shaped metal member attached to the plate, and with the plate adapted to form a brush guide, a brush slidable in said guide, a U-shaped spring member slidable in said guide and having its yoke portion adjacent one end of the brush and its branch portions resiliently bearing against opposite walls of the channel member, and means within the guide for urging the U-shaped member and brush toward the commutator.

4. A dynamo-electric-machine according to claim 3, in which the U-shaped member and brush are urged toward the commutator by a coil spring located within the guide, and the spring is retained by a second U-shaped member similar to the first U-shaped member but so located within the guide that its branch portions are in planes at right angles to the planes of the branch portions of the first U-shaped member, and means carried by the plate for engaging the yoke of the second U-shaped member.

5. A dynamo-electric-machine comprising, in combination, a frame including an end member, a field magnet supported by the frame, a shaft journaled in a bearing carried by the end member, and armature and commutator carried by the shaft, the commutator being adjacent the end member, a non-conducting brush supporting plate attached to the end member, a sheet metal member formed channel-shaped and having a mounting lug extending intermediate the ends of one of the channel flanges and at least two mounting lugs extending from the other channel flange and adjacent the ends thereof, the last mentioned lugs being spaced by a notch shaped like the first mentioned mounting lug, means for securing the lugs to the plate so that the channel member and plate provide a brush guide, a brush in said guide, and means for urging the brush toward the commutator.

6. A dynamo electric machine comprising in combination a frame providing a shaft bearing, a shaft carrying a commutator supported by the frame, and a commutator brush rigging comprising a non-conducting plate attached to the frame adjacent to the commutator, a channel shaped metallic member attached to the plate and co-operating therewith to form a brush guide, a brush slidable in said guide toward the said commutator and a spring retained within the guide for urging the brush into contact with the commutator.

7. A dynamo electric machine comprising in combination, a frame providing a shaft bearing, a shaft carrying a commutator supported by the frame, and a commutator brush rigging comprising a non-conducting plate located adjacent to the commutator and having an intermediate mounting portion attached to the frame and located on one side of the commutator and having brush supporting portions located on diametrically opposite sides of the commutator, channel shaped metallic members attached respectively to the brush supporting portions of the plate and cooperating therewith to form brush guides, brushes slidable within the guides toward the commutator, and springs located within the guides for the purpose of urging the brushes into engagement with the commutator.

8. A dynamo electric machine comprising in combination, a mounting frame including an end member, a U-shaped field frame having its branches attached to the mounting frame and its yoke portion relatively elongated and maintained by the branches of the yoke in spaced relation to the mounting frame, a shaft rotatably supported by the mounting frame and the yoke portion of the field frame, a commutator carried by the shaft adjacent the yoke of the field frame, and a commutator brush rigging comprising a plate which includes an intermediate portion mounted upon the yoke of the field frame and includes brush supporting portions which extend from the mounting portion in directions transverse to the longer dimensions of the yoke, so that the brush supporting portions will extend beyond the sides of the yoke of the field frame, brush guide members insulatingly carried by the brush supporting portions of the plate, brushes slidable within the brush guides and springs within the brush guides for urging the brushes into engagement with the commutator.

9. A dynamo electric machine comprising in combination, a frame providing a shaft bearing, a shaft carrying a commutator supported by the frame, and a commutator brush rigging comprising a plate located adjacent the commutator and having an intermediate mounting portion attached to the frame and brush supporting portions located on opposite sides of the commutator, channel-shaped metallic members insulatingly carried by the brush supporting portions of the plate and cooperating therewith to form brush guides, brushes slidable within the guides toward the commutator and springs located within the guides for urging the brushes into engagement with the commutator.

10. A dynamo electric machine comprising in combination, a frame providing a shaft bearing, a shaft carrying a commutator supported by the frame, and a commutator brush rigging comprising a plate located adjacent the commutator and having an intermediate mounting portion attached to the frame and brush supporting portions located on opposite sides of the commutator, brush guide members insulatingly carried by the brush supporting portions of the plate, brushes slidable within the guides toward the commutator and springs located within the guides for urging the brushes into engagement with the commutator.

11. A dynamo electric machine comprising in combination, a mounting frame including an end member, a U-shaped field frame having its branches attached to the mounting frame and its yoke portion relatively elongated and maintained by the branches of the yoke in spaced relation to the mounting frame, a shaft rotatably supported by the mounting frame and the yoke portion of the field frame, a commutator carried by the shaft adjacent the yoke of the field frame, and a commutator brush rigging comprising a plate which includes an intermediate portion mounted upon the yoke of the field frame and includes brush supporting portions which extend from the mounting portion in directions transverse to the longer dimensions of the yoke, so that the brush supporting portions will extend beyond the sides of the yoke of the field frame, said brush supporting portions being spaced from the plane of the yoke portion of the field frame, brushes in alignment with the commutator insulatingly supported by the brush supporting portions of the plate, and springs for urging the brushes toward the commutator.

In testimony whereof I hereto affix my signature.

ROBERT M. CRITCHFIELD.